US010321667B2

(12) United States Patent
Jackson

(10) Patent No.: US 10,321,667 B2
(45) Date of Patent: Jun. 18, 2019

(54) MULTIPURPOSE BEEHIVE ACCESS SYSTEM

(71) Applicant: Carl Jackson, Corbin, KY (US)

(72) Inventor: Carl Jackson, Corbin, KY (US)

( * ) Notice: Subject to any disclaimer, the term of this patent is extended or adjusted under 35 U.S.C. 154(b) by 245 days.

(21) Appl. No.: 15/289,344

(22) Filed: Oct. 10, 2016

(65) Prior Publication Data

US 2017/0188549 A1 Jul. 6, 2017

Related U.S. Application Data

(60) Provisional application No. 62/275,039, filed on Jan. 5, 2016.

(51) Int. Cl.
*A01K 47/06* (2006.01)

(52) U.S. Cl.
CPC ..................... *A01K 47/06* (2013.01)

(58) Field of Classification Search
CPC ................. A01K 47/06; A01K 49/00
See application file for complete search history.

(56) References Cited

U.S. PATENT DOCUMENTS

| 2,122 | A | * | 6/1841 | Patourel | ................. | A01K 47/06 |
| | | | | | | 449/13 |
| 137,831 | A | * | 4/1873 | Davis | ...................... | A01K 47/06 |
| | | | | | | 449/21 |
| 1,607,659 | A | * | 11/1926 | Will | ........................ | A01K 53/00 |
| | | | | | | 449/15 |
| 4,483,031 | A | * | 11/1984 | Shaparew | .............. | A01K 47/06 |
| | | | | | | 449/14 |
| 4,517,694 | A | * | 5/1985 | Hong | ..................... | A01K 47/06 |
| | | | | | | 449/19 |
| 8,764,512 | B1 | * | 7/2014 | Watson | ................... | A01K 47/06 |
| | | | | | | 449/15 |

FOREIGN PATENT DOCUMENTS

| CH | 674914 A5 | * | 8/1990 | ............. A01K 47/06 |
| FR | 2627949 A1 | * | 9/1989 | ............. A01K 47/06 |
| JP | 2004236584 A | * | 8/2004 | |

* cited by examiner

*Primary Examiner* — Son T Nguyen
(74) *Attorney, Agent, or Firm* — Luedeka Neely Group, P.C.

(57) ABSTRACT

A multipurpose beehive access structure includes a housing designed to be placed on top of a standard beehive box. The housing includes a bottom plate with a central aperture through which frames in the beehive box below may be accessed. A removable cover assembly includes a cover plate for covering the central aperture. A queen cage aperture is provided in the cover plate. A queen cage placed in the queen cage aperture rests on top of the frames below. The queen cage aperture provides a passageway between the queen cage and the interior of the beehive to allow bees to access the queen cage. A multi-position vent block has a passageway that provides ventilation and a second entrance to the beehive when positioned between a side aperture and a bottom aperture in the housing. The vent block may also be positioned to close off the second entrance.

17 Claims, 10 Drawing Sheets

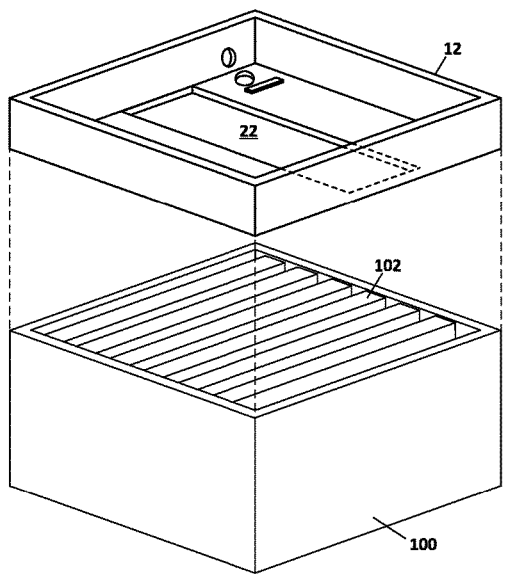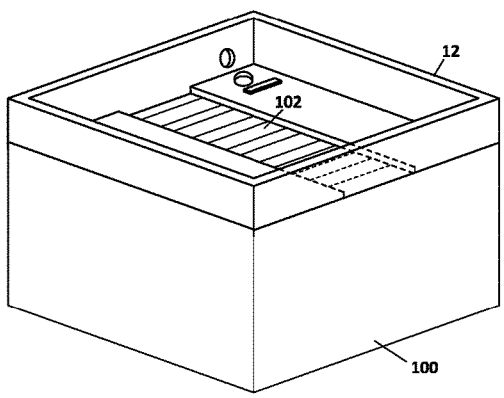
*FIG. 3A*  *FIG. 3B*

MULTIPURPOSE BEEHIVE ACCESS SYSTEM

RELATED APPLICATIONS

This application claims priority to provisional patent application Ser. No. 62/275,039, filed Jan. 5, 2016, titled. "Upper Bee Hive Chamber with Hinged Cover," the entire content of which is incorporated here by reference in its entirety.

FIELD

This invention relates to the field of bee keeping. More particularly, this invention relates to a structure that provides access to the interior of a beehive in multiple ways for multiple purposes.

BACKGROUND

FIGS. 2 and 4 depict a standard beehive box 100. Standard sizes (length×width) of beehive boxes include 18.375× 14.750 inch (holds 10 frames), 18.375×12.250 inch (8 frames), and 18.375×7.750 inch (5 frames). Various embodiments of the invention described herein are compatible with beehive boxes of all sizes. In a typical beehive, there may be multiple such boxes 100 in a stack. Each box 100 contains multiple removable frames 102 with spaces of about 0.25 to 0.375 inches in between adjacent frames. The frames 102 provide structure on which the bees can construct honeycomb.

In the past, in order to install a queen cage to introduce a new queen into the hive, the queen cage had to be, wedged into a space between two of the frames. Because the width of a standard queen cage is somewhat larger than the space between frames, the frames had to be forced apart to widen the space to allow for insertion of the queen cage. This can be an arduous task. If the queen cage is pushed in too far, it can fall down between frames into the hive box, which makes it difficult to find and remove after the queen has been released. Also, forcing the queen cage in between frames can cause the width of the space to exceed 0.375 inch, in which case the bees will build honeycomb between the upper portions of the forced apart frames. This makes it difficult to remove the affected frames to access the honeycomb for harvesting.

In a typical beehive, an inner cover is put in place over the top of the uppermost box 100 in a stack to create a dead air space, and a weatherproof cover is put in place over the inner cover. In order to inspect the hive or insert a supplemental food packet, the weatherproof cover must be removed and then the inner cover must be removed. This exposes the entire upper box of the hive to the weather. It also exposes the beekeeper to a large portion of the colony. This can cause problems for the bees if the weather is cold or wet, and it can cause problems for the beekeeper if the bees are aggressive. Thus, with a standard beehive box arrangement, there is no easy way to do a quick inspection of the hive without disturbing the colony.

Another problem with standard beehive covets is the lack of a second entrance into the hive, and the lack of sufficient ventilation for the hive. Ventilation is required to remove excess moisture from the hive to facilitate dehydration of nectar to, make honey.

The above and other needs are met by a multipurpose beehive access structure for use on a standard beehive box. In a preferred embodiment, the access structure includes a housing having four interconnecting sidewalls that enclose a rectangular interior space. The dimensions of the sidewalls are such that the housing contacts and is supported by the walls of the beehive box when the housing is placed on top of the beehive box. The housing includes a bottom plate structure that spans at least a portion of the area between the housing sidewalls. The bottom plate structure is configured to cover at least some of the multiple removable frames enclosed in the beehive box when the housing is placed on top of the beehive box. The housing also includes a central aperture through or adjacent the bottom plate structure. The central aperture provides access to at least same of the frames enclosed in the interior space of the beehive box when the housing is on top of the beehive box.

The multipurpose beehive access structure comprises a removable cover assembly that includes a cover plate that is dimensioned to cover at least a portion of the central aperture when disposed over or within the central aperture. In a preferred embodiment, a queen cage aperture passes through the cover plate of the cover assembly or through the bottom plate structure of the housing. The queen cage aperture is configured to receive a queen cage and provide a passageway between the queen cage and the interior space of the beehive box when the housing is on top of the beehive box.

In some embodiments, the bottom plate structure includes two bottom plates that are separated by the central aperture.

In some embodiments, the multipurpose beehive access structure includes a removable aperture cover for covering the queen cage aperture.

In some embodiments, the multipurpose beehive access structure includes a removable spacer enclosure that is configured to surround the queen cage aperture and to surround a space above the queen cage aperture. Some embodiments provide a removable aperture cover for covering the removable spacer enclosure and enclosing the space therein.

In some embodiments, the cover assembly includes a plate vent aperture passing through the cover plate. The plate vent aperture provides a ventilation passageway between the interior space of the beehive box and the interior space of the housing.

In some embodiments, the housing includes a side vent aperture passing through one of the four sidewalls, and a lower vent aperture passing through the bottom plate structure and disposed adjacent the side vent aperture. These embodiments include a removable vent block having a first opening, a second opening, and an internal passageway connecting the first and second openings. The vent block may be disposed in first and second positions with respect to the side vent aperture and the lower vent aperture of the housing.

When the vent block is in the first position, the first opening of the vent block is adjacent the sidewall through which the side vent aperture passes and the first opening is substantially aligned with the side vent aperture. Also when the vent block is in the first position, the second opening of the vent block is adjacent the bottom plate structure and is substantially aligned with, the lower vent aperture. Thus, in the first position the internal passageway of the vent block connects, the side vent aperture to the lower vent aperture, so that bees may pass from the interior of the beehive box through the internal passageway of the vent block to the exterior of the multipurpose beehive access structure.

When the vent block is in the second position, one or both of the first and second openings of the vent block are not aligned with the side vent aperture or the lower vent aperture. Thus, in the second position the internal passageway of the vent block does not connect the side vent aperture to the lower vent aperture, so that bees may not pass from the interior of the beehive box to the exterior of the multipurpose beehive access structure through the internal passageway of the vent block.

In some embodiments, when the vent block is in the first position, a vent screen may be disposed between the side vent aperture and the first opening. Alternatively, the vent screen may be disposed between the lower vent aperture and the second opening. In either position, the vent screen provides for air ventilation while blocking the passage of bees through the vent block.

In some embodiments, the cover assembly includes a handle for use in removing and replacing the cover assembly with respect to the housing.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIGS. 3A and 3B depict a preferred embodiment of the multipurpose beehive access structure disposed over and covering the open top of a standard beehive box;

DETAILED DESCRIPTION

Figure 1:
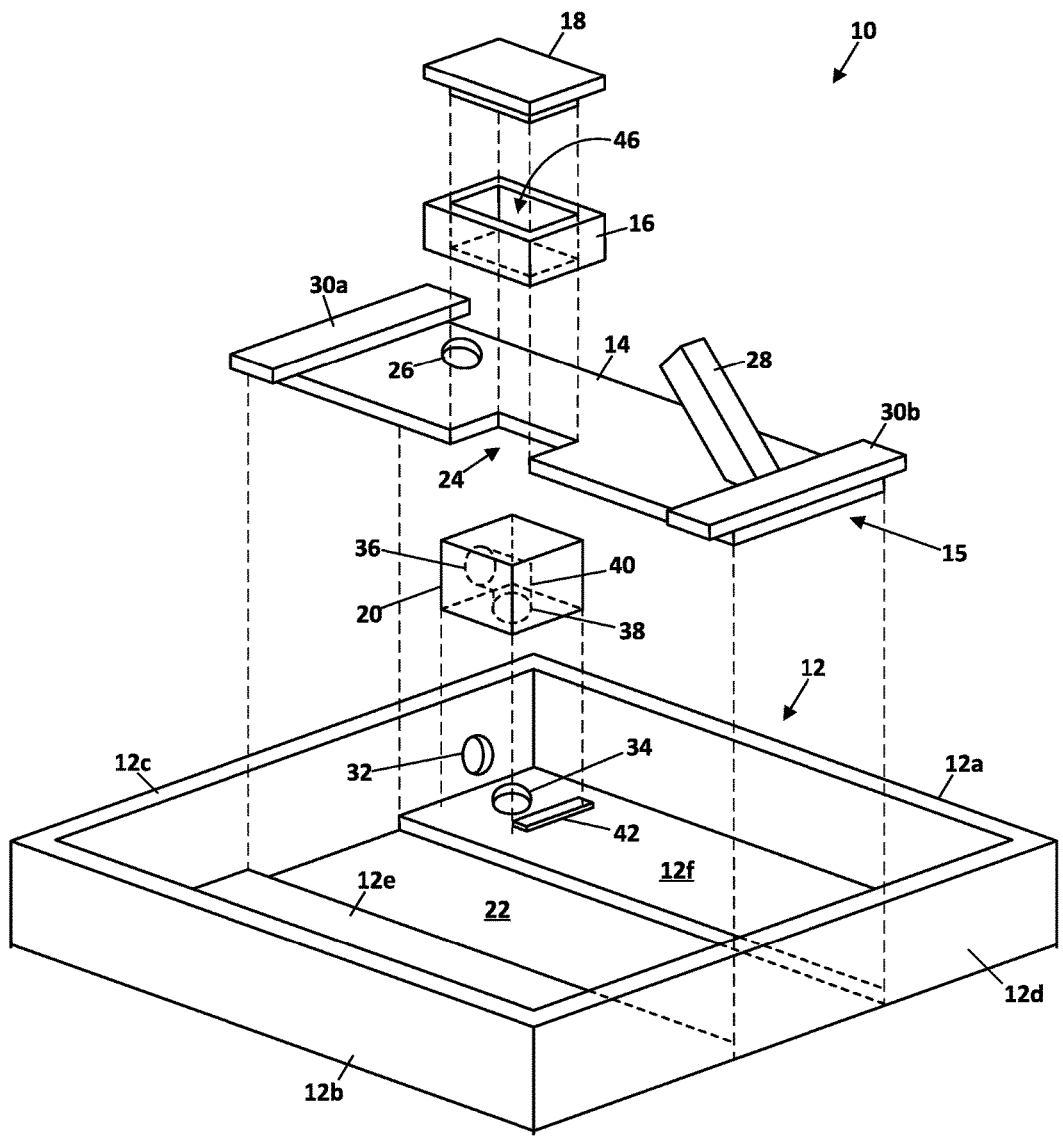
FIG. 1 depicts a multipurpose beehive access structure according to an embodiment of the invention.
Figure 2:
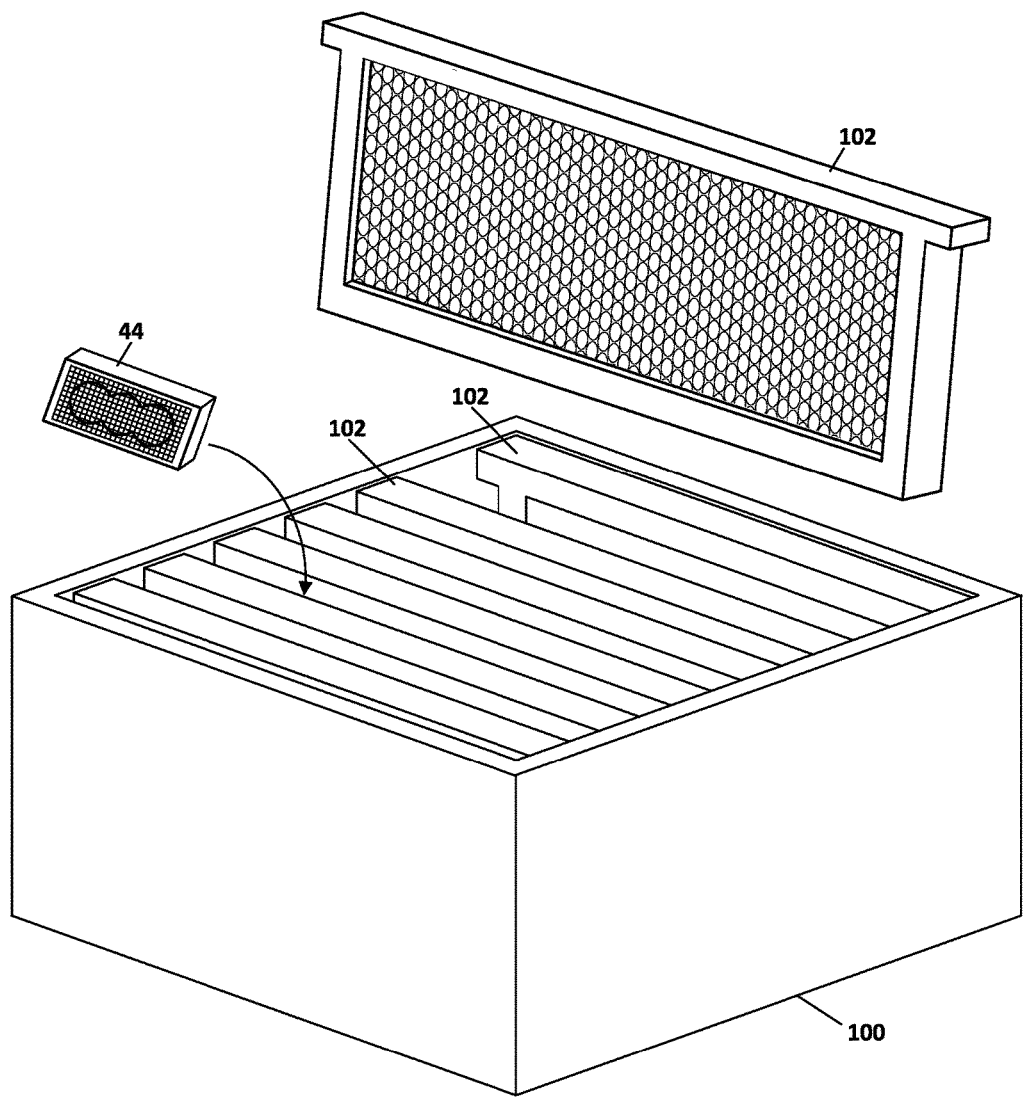
FIG. 2 depicts a perspective view of a standard beehive box with its top open and a frame removed.
Figure 4:
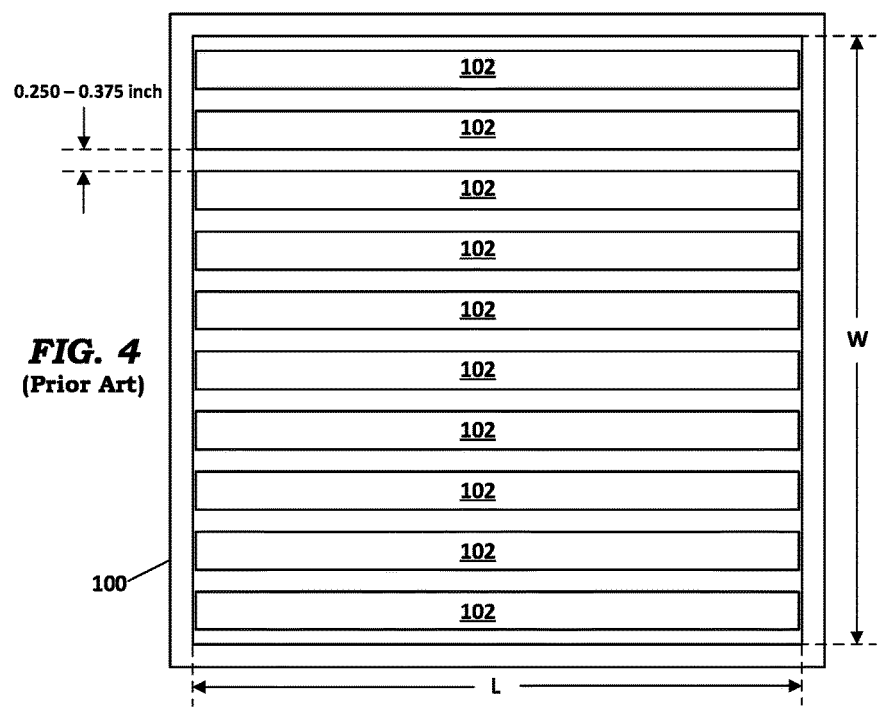
FIG. 4 depicts a top plan view of a standard beehive box with its top open.
Figure 5:
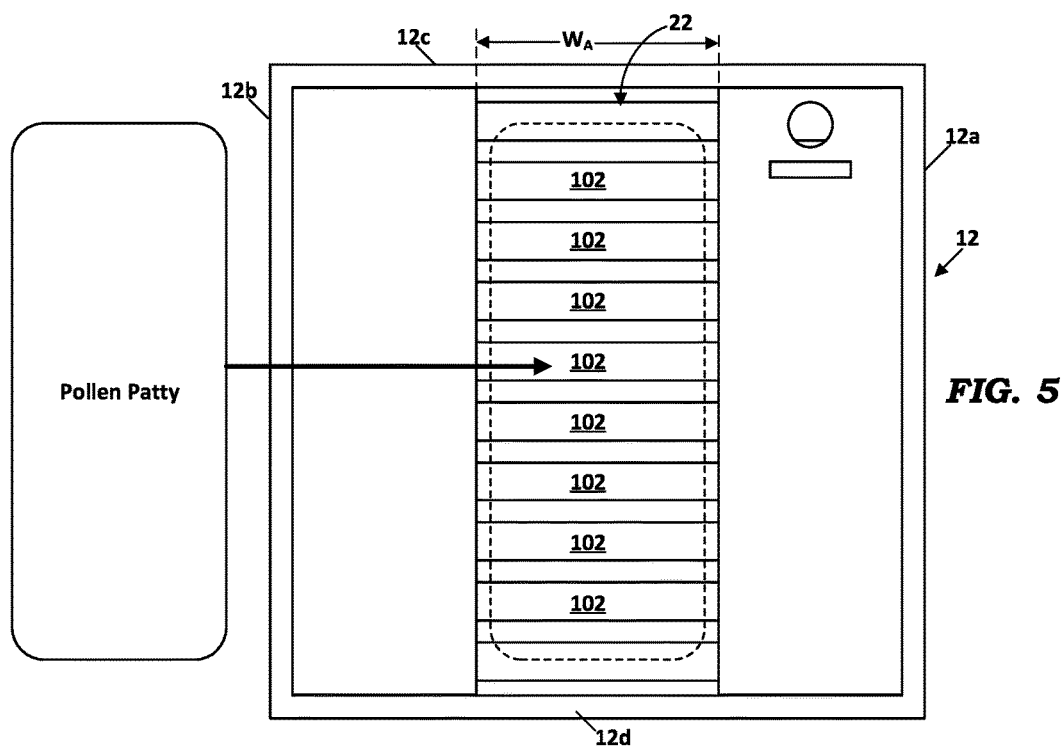
FIG. 5 depicts a top plan view of a preferred embodiment of the multipurpose beehive access structure covering a standard beehive box.

As shown in FIG. 1, a preferred embodiment of a multipurpose beehive access structure 10 includes a housing 12, a cover assembly 15, a spacer enclosure 16, an aperture cover 18, and a vent block 20. The housing 12 includes sidewalls 12a, 12b, 12c and 12d and a bottom plate structure preferably comprising two bottom plates 12e and 12f that span the distance between two of the sidewalls. Disposed between the bottom plates 12e and 12f is a central aperture 22. In a preferred embodiment as depicted in FIG. 5, the width $W_A$ of the central aperture is about 5 and ⅛ inches. The housing 12 also preferably includes a lower vent aperture 34 in the bottom plate 12f and a side vent aperture 32 in the sidewall 12c.

Although the preferred embodiment of the bottom plate structure includes two bottom plates separated by the central aperture, it will be appreciated that an alternative embodiment may include a single bottom plate that spans a portion of the area between the sidewalls, and a central aperture that spans the remainder of the area between the sidewalls. In yet another alternative embodiment, the bottom plate structure may comprise a single bottom plate that spans all of the area between the sidewalk, with a central aperture disposed in the bottom plate.

The cover assembly 15 includes a cover plate 14, cross members 30a and 30b, a handle 28, a queen cage aperture 24, and a plate vent aperture 26. In the preferred embodiment, the dimensions of the cover plate 14 substantially match but are slightly less than the dimensions of the central aperture 22, so that the cover plate 14 fits completely within the central aperture 22 when the cover assembly 15 is disposed in a closed position within the housing 12. The cover assembly 15 is shown in the closed position in FIGS. 7-16. The outwardly extending ends of the cross members 30a-30b prevent the cover plate 14 from dropping below the bottom plates 12e-12f when the cover assembly 15 is in the closed position.

The spacer enclosure 16 encloses a queen cage chamber 46 that has dimensions substantially matching the dimensions of the queen cage aperture 24. As described in more detail hereinafter, the aperture cover 18 can be used to cover the queen cage chamber 46 when the spacer enclosure 16 is installed, or to cover the queen cage aperture 24 when the spacer enclosure 16 is not installed.

As shown in FIGS. 3A-3B, 4 and 5, the sidewalls 12a-12d of the multipurpose beehive access structure 10 are dimensioned to align with the sidewalls of the standard beehive box 100 so that, when the multipurpose beehive access structure 10 is in place on top of the box 100, the box 100 fully supports and is completely covered by the multipurpose beehive access structure 10. As depicted in FIGS. 3B and 5, when the cover assembly 15 is removed from the central aperture 22, at least a portion of each of the honey frames 102 is visible for inspection. However, the central aperture 22 is not so large as to cause serious exposure or disruption of the bee colony within the beehive box 100 when the cover assembly 15 is removed.

As shown in FIG. 5, the central aperture 22 also provides a space in which to lay a pollen patty or winter food patty on top of the frames 102 for supplemental feeding of the colony. After the pollen patty is in place over the frames 102, the cover assembly 15 with the aperture cover 18 can be replaced to cover the pollen patty and enclose the colony.

Figure 6:
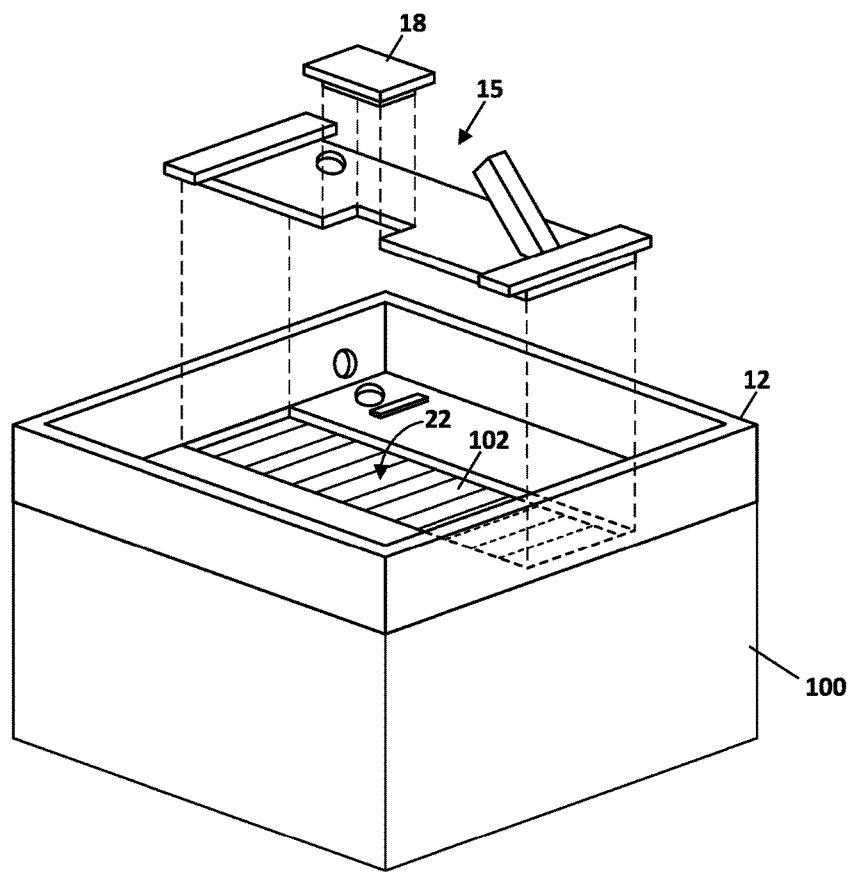
FIG. 6 depicts a cover assembly disposed over a central opening of a preferred embodiment of the multipurpose beehive access structure.
Figure 7:
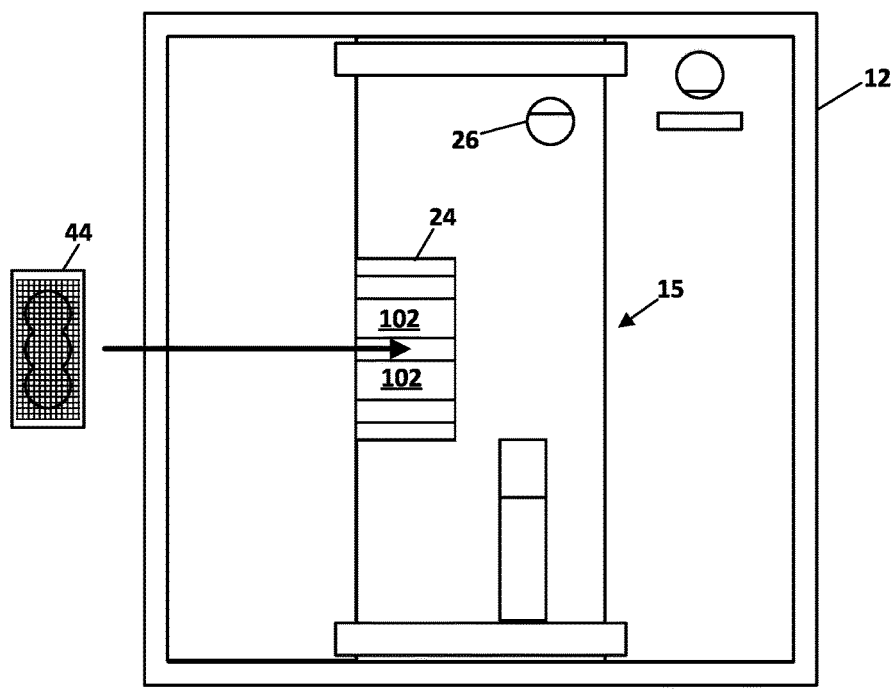
FIG. 7 depicts the cover assembly disposed in the central opening of a preferred embodiment of the multipurpose beehive access structure.
Figure 8:
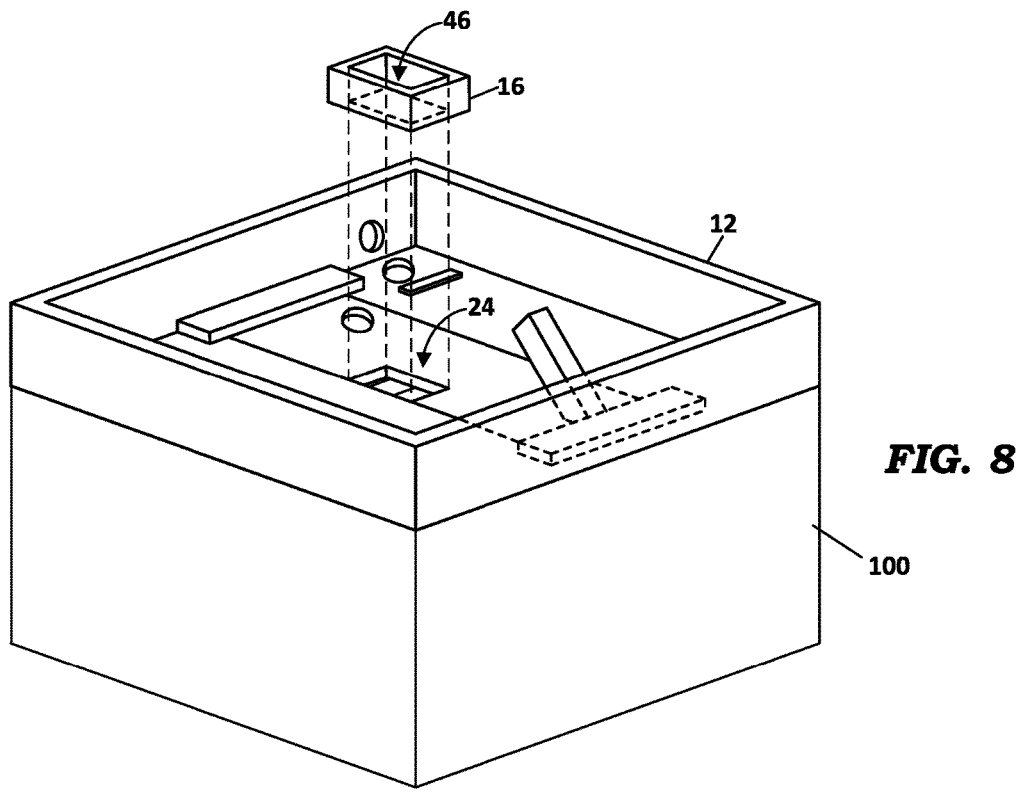
FIG. 8 depicts a spacer enclosure disposed over a queen cage access opening in the cover assembly of a preferred embodiment of the multipurpose beehive access structure.
Figure 9:
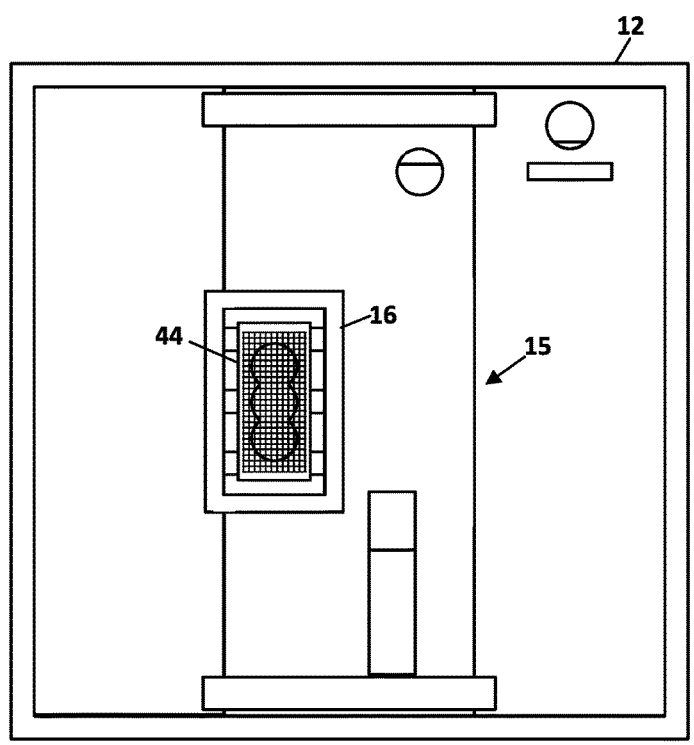
FIG. 9 depicts a queen cage disposed within the spacer enclosure of a preferred embodiment of the multipurpose beehive access structure.
Figure 10:
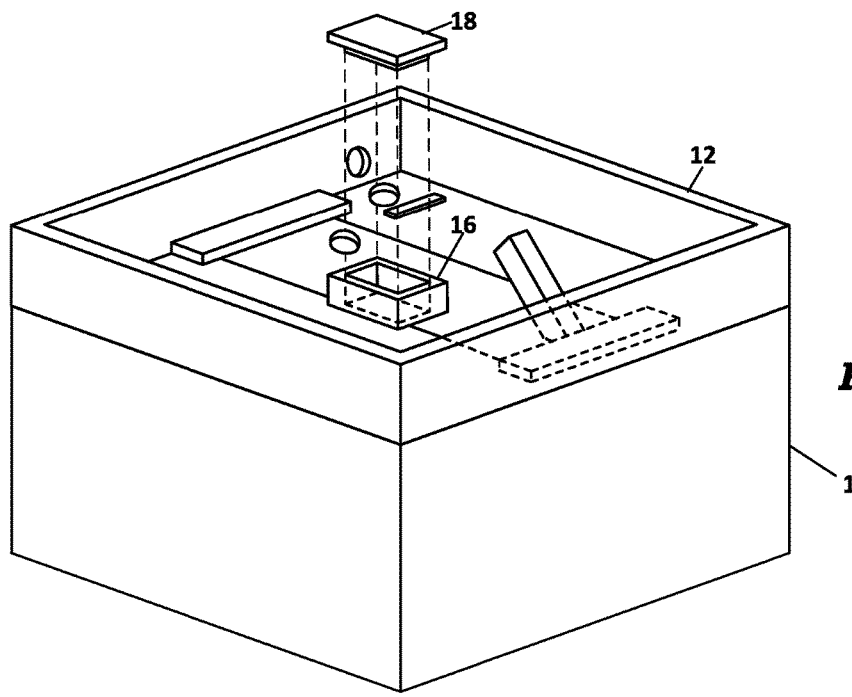
FIG. 10 depicts a aperture cover disposed over the spacer enclosure of a preferred embodiment of the multipurpose beehive access structure.

With reference to FIGS. 6 and 7, when the cover assembly 15 is disposed within the central aperture 22 and the aperture cover 18 is removed, a small portion of the frames 102 are exposed through the aperture 24. This provides a space for receiving a queen cage 44 on top of the frames 102, thereby exposing the queen cage 44 to the colony to introduce a new queen bee. Since the queen cage 44 lays on top of the frames 102, there is no need to force the queen cage 44 down into a space between frames. With the queen cage 44 centered within the aperture 24, the spacer enclosure 16 can be put in place around the aperture 24 as shown in FIG. 9, thereby providing the queen cage chamber 46. Once the cover hatch 18 is put in place over the spacer enclosure 16 (FIG. 10), the bees can move around within the queen cage chamber 46 as they work to free the queen from the queen cage 44 over a period of days. In an alternative embodiment, the aperture cover 18 is permanently affixed to the spacer enclosure 16 to form an integrated removable structure that covers and encloses the queen cage 44 within the aperture 24.

The plate vent aperture 26 provides an air passage between the interior of the housing 12 and the hive box 100 below. This provides for temperature control and ventilation of the beehive. The plate vent aperture 26 also allows the bees to access the space within housing 12 under the weatherproof cover to access a feed container of corn syrup or sugar water for supplemental feeding.

Through the aperture 26, the bees can also access a feed test station within the housing 12 where new food options for bees may be tested. For example, a container or tray of a food to be tested may be placed within the housing 12. The bees can enter the housing 12 through the aperture 26 to access to the test container. If after some period of time the test container is empty, this indicates that the bees used the food, which means it provided some benefit to the bees. If after some period of time there is still food in the test container, this indicates that the bees are getting no, benefit from it.

If food to be tested were just dropped down into hive for the bees to access, the beekeeper would not know whether the bees, had actually consumed it or not. If the bees found no benefit from the test food dropped into the hive, the bees may remove it from the hive. Upon later observation, the beekeeper may get the false impression that the test food was consumed when in fact the bees had removed and disposed of it.

Figure 15:
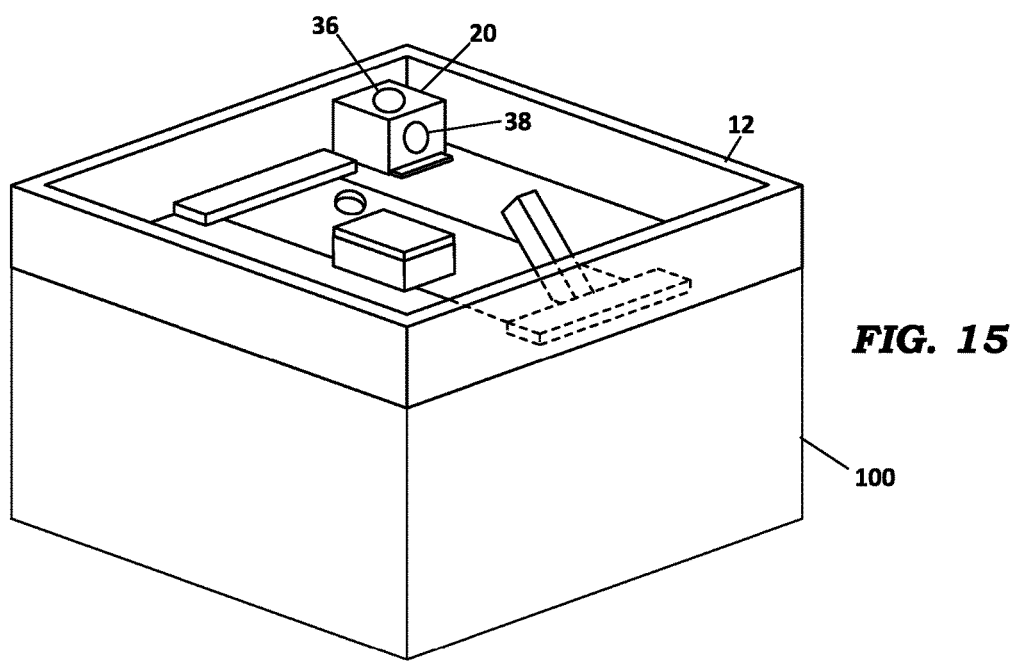
Figure 16:
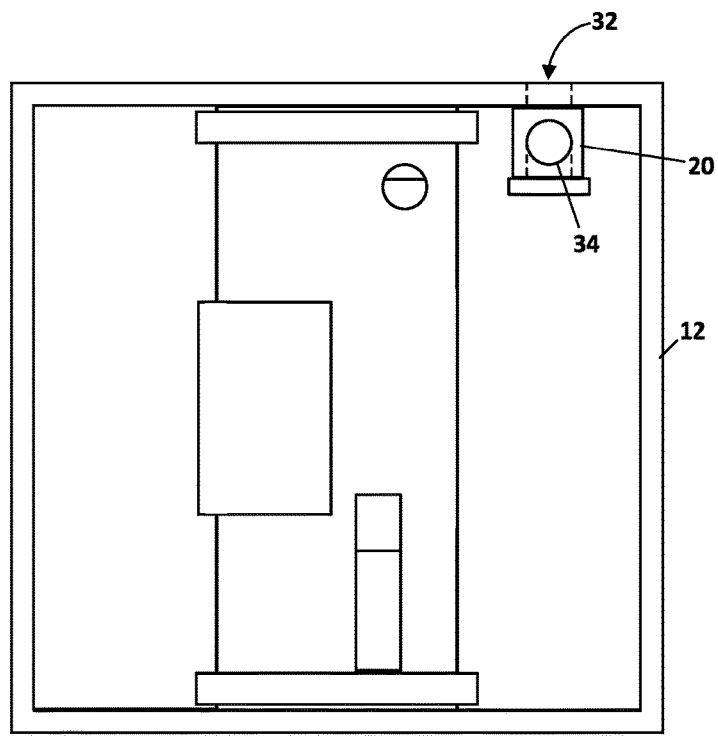
Figure 17A:
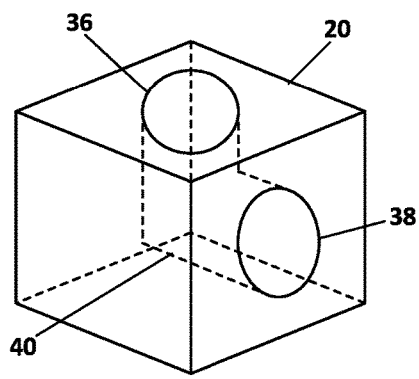
FIGS. 17A and 17B depict two embodiments of a vent passage block of a multipurpose beehive access structure.

A preferred embodiment of the invention includes a multi-purpose vent block 20, as depicted in FIG. 17A, that may be positioned in multiple configurations as shown in FIGS. 11-16. The vent block 20 is preferably a cube having an internal passageway 40 that connects a first opening 36 in one wall of the block 20 with, a second opening 38 in an adjacent wall of the block 20. To provide a second entrance for the beehive, the block 20 is positioned on bottom plate 12f of, the housing 12 between the sidewall 12c and the retaining plate 42, with the first opening 36 of the block aligned with the aperture 32 in the sidewall 12c and with the second opening 38 of the block aligned with the aperture 34 in the bottom plate 12f. In this configuration, bees may access the box 100 of the beehive by entering the aperture 32, traversing the internal passageway 40, and passing through the aperture 34.

Figure 11:
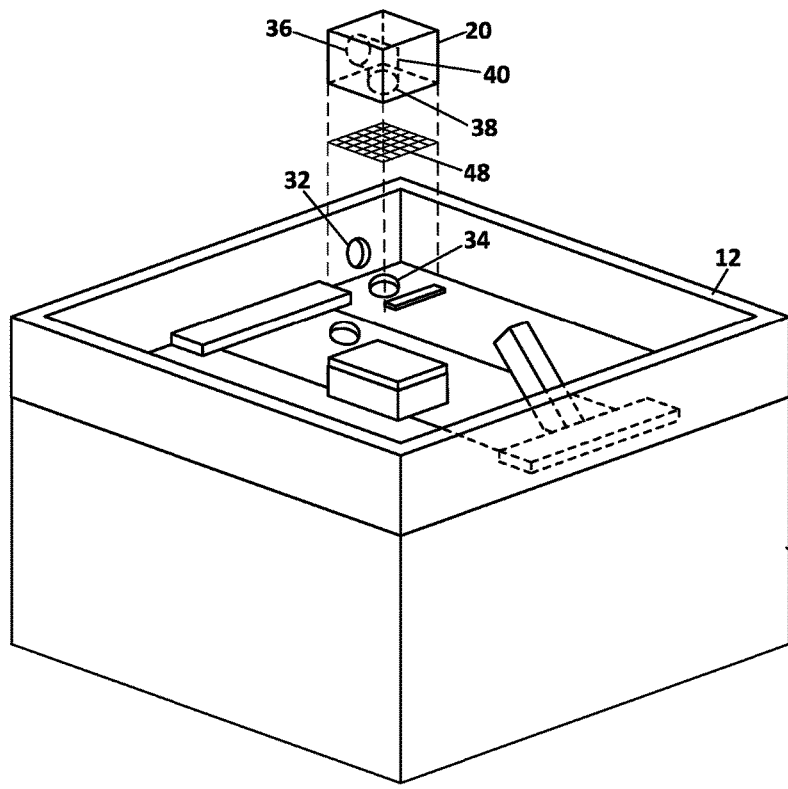
FIG. 11 depicts a vent passage block and vent screen of a preferred embodiment of the multipurpose beehive access structure.
Figure 12:
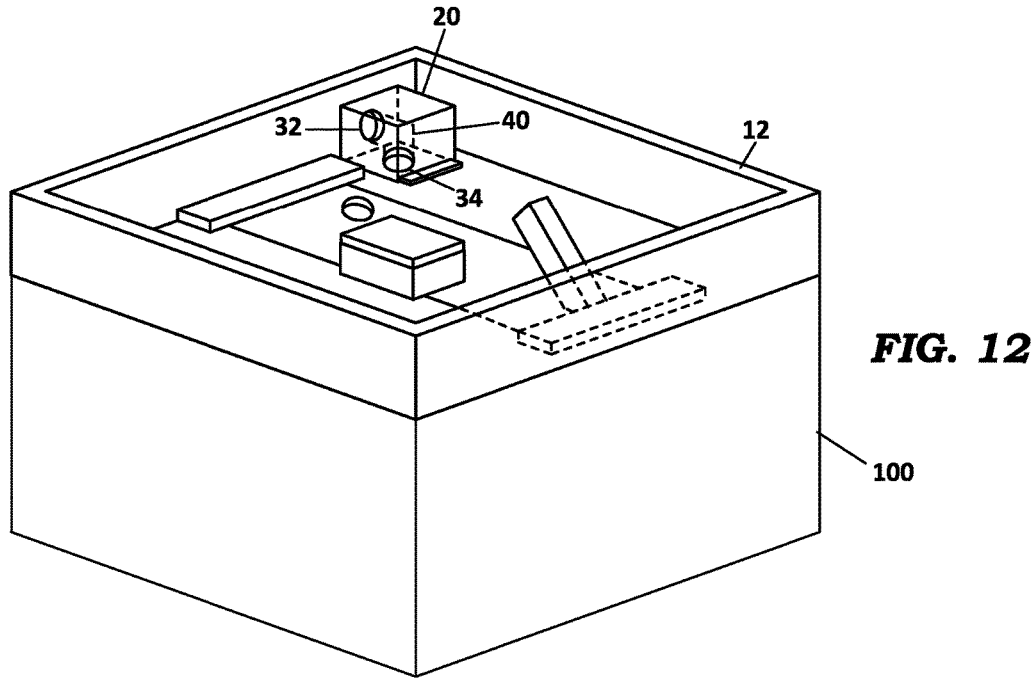
FIGS. 12 and 13 depict the vent passage block disposed in an air venting orientation with respect to the vent apertures of a preferred embodiment of the multipurpose beehive access structure.
Figure 13:
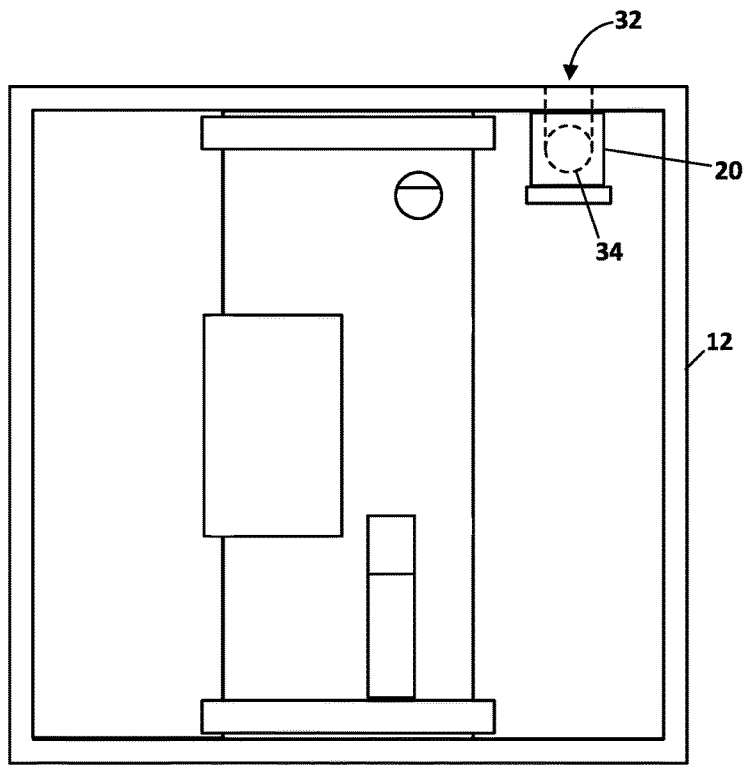

To provide ventilation for the beehive without providing a second entrance, the block 30 is positioned in the manner described above, except a vent screen 48 is placed over the aperture 34 between the block 20 and the bottom plate 12 of the housing 15 (FIG. 11). The vent screen 48 allows the passage of air, hut not bees, through the passageway 40. Ventilation of the beehive to reduce humidity is important during times of high nectar flow.

Figure 14:
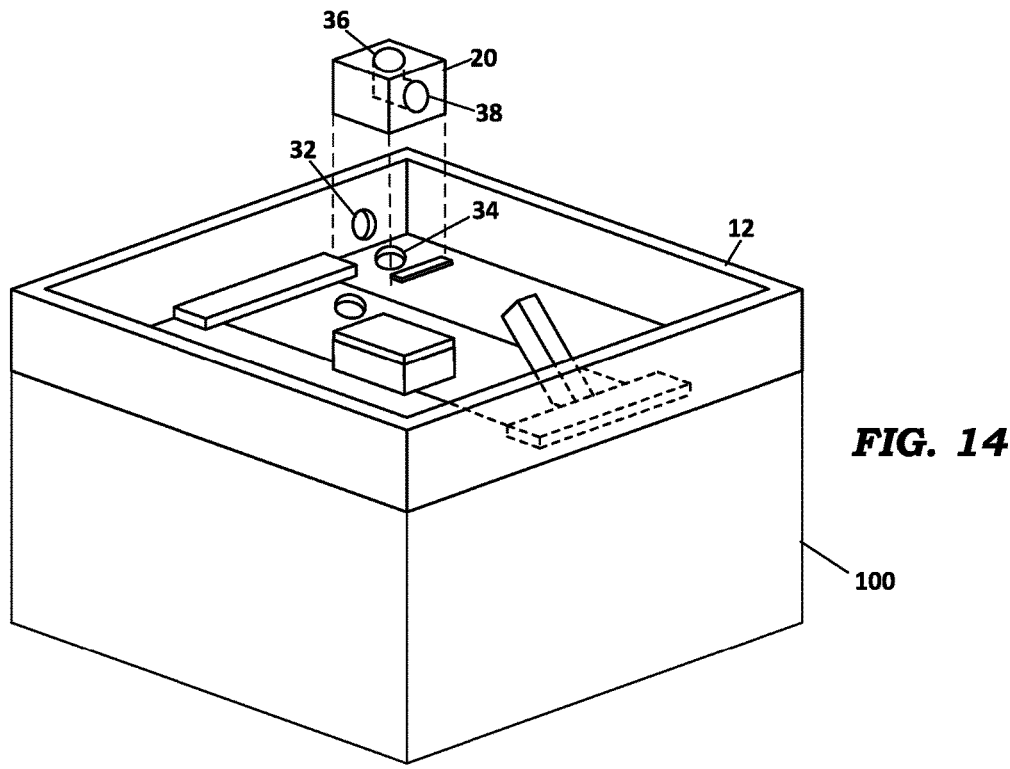
FIGS. 14, 15 and 16 depict a vent passage block disposed in a non-venting orientation with respect to the vent apertures of a preferred embodiment of the multipurpose beehive access structure.

As shown in FIGS. 14-16, to completely block off the second entrance and not provide ventilation, the block 20 is positioned on bottom plate 12f of the housing 12 between the sidewall 12c and the retaining plate 42, with the first and second openings 36 and 38 not aligned with the apertures 32 and 34. In this position, the block 20 seals off the apertures 32 and 34, thereby preventing the passage of bees and air.

Figure 17B:
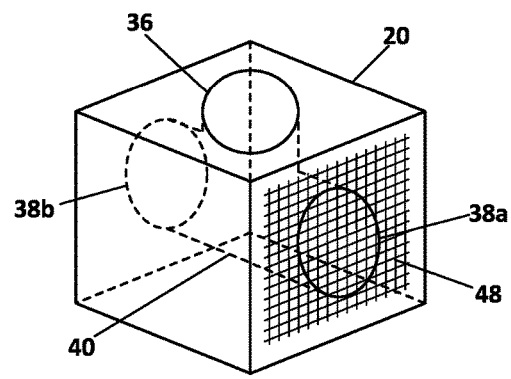

As shown in FIG. 17B, an alternative embodiment of the block 20 provides an air passage opening 38a to which the vent screen 48 is permanently affixed, and a bee passage opening 38b through which bees may pass, both of which are in communication with the first opening 36 via the passage 40. With this embodiment, the appropriate positioning of the block 20 with respect to the apertures 32 and 34 determines whether the block 20 provides a second entrance passage, provides a ventilation passage, or provides no passage at all.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A multipurpose beehive access structure configured to be removably placed on top of on a standard beehive box, the multipurpose beehive access structure comprising:
   a housing including:
      four interconnecting sidewalls that enclose a rectangular interior space within the housing;
      a bottom plate structure spanning at least a portion of an area between the sidewalls; and
      a central aperture passing through the bottom plate structure or disposed adjacent the bottom plate structure;
   a removable cover assembly comprising at least one cover plate that is dimensioned to cover at least a portion of the central aperture when disposed over or within the central aperture; and
   a queen cage aperture passing through the at least one cover plate of the cover assembly or through the bottom plate structure of the housing, the queen cage aperture for receiving a queen cage and providing a passageway between the queen cage and the interior space of a standard beehive box if the multipurpose beehive access structure is removably placed on top of the standard beehive box; the housing including: a side vent aperture passing through one of the four sidewalls; a lower vent aperture passing through the bottom plate structure and disposed adjacent the side vent aperture; and a removable vent block that is removably disposed in multiple positions with respect to the side vent aperture and the lower vent aperture of the housing, the vent block comprising: a first opening; a second opening; and an internal passageway connecting the first and second openings, wherein, when the vent block is disposed in a first position, the first opening of the vent block is adjacent the sidewall through which the side vent aperture passes and is substantially aligned with the side vent aperture, and the second opening of the vent block is adjacent the bottom plate structure and is substantially aligned with the lower vent aperture, such that the internal passageway of the vent block connects the side vent aperture to the lower vent aperture, whereby bees may pass through the internal passageway of the vent block to an exterior of the multipurpose beehive access structure, and wherein, when the vent block is disposed in a second position, one or both of the first and second openings of the vent block are not aligned with the side vent aperture or the lower vent aperture, such that the internal passageway of the vent block does not connect the side vent aperture to the lower vent aperture, whereby bees may not pass to the exterior of the multipurpose beehive access structure through the internal passageway of the vent block.

2. The multipurpose beehive access structure of claim 1 wherein the bottom plate structure comprises two bottom plates that are separated by the central aperture.

3. The multipurpose beehive access structure of claim 1 further comprising a removable aperture cover that covers the queen cage aperture.

4. The multipurpose beehive access structure of claim 1 further comprising a removable spacer enclosure that surrounds the queen cage aperture and surrounds a space above the queen cage aperture.

5. The multipurpose beehive access structure of claim 4 further comprising a removable aperture cover that covers the removable spacer enclosure and encloses the space therein.

6. The multipurpose beehive access structure of claim 1 wherein the cover assembly further comprises a plate vent aperture passing through the cover plate.

7. The multipurpose beehive access structure of claim 1 further comprising a vent screen disposed between the side vent aperture and the first opening or between the lower vent aperture and the second opening when the vent block is in the first position, the vent screen providing air ventilation while blocking the passage of bees.

8. The multipurpose beehive access structure of claim 1 wherein the cover assembly includes a handle for use in removing and replacing the cover assembly with respect to the housing.

9. A multipurpose beehive access structure configured to be removably placed on top of on a standard beehive box, the multipurpose beehive access structure comprising:
a housing including:
four interconnecting sidewalls that enclose a rectangular interior space within the housing;
a bottom plate structure spanning at least a portion of an area between the sidewalls;
a central aperture disposed through or adjacent the bottom plate structure;
a side vent aperture passing through one of the four sidewalls of the housing; and
a lower vent aperture passing through the bottom plate structure and disposed adjacent the side vent aperture;
a removable cover assembly comprising at least one cover plate that is dimensioned to cover at least a portion of the central aperture when disposed over or within the central aperture; and
a removable vent block that is operable to be disposed in multiple positions with respect to the side vent aperture and the lower vent aperture of the housing, the vent block comprising:
a first opening;
a second opening; and
an internal passageway connecting the first and second openings,
wherein, when the vent block is disposed in a first position, the first opening of the vent block is adjacent the sidewall through which the side vent aperture passes and is substantially aligned with the side vent aperture, and the second opening of the vent block is adjacent the bottom plate structure and is substantially aligned with the lower vent aperture, such that the internal passageway of the vent block connects the side vent aperture to the lower vent aperture, whereby bees may pass through the internal passageway of the vent block to an exterior of the multipurpose beehive access structure, and
wherein, when the vent block is disposed in a second position, one or both of the first and second openings of the vent block are not aligned with the side vent aperture or the lower vent aperture, such that the internal passageway of the vent block does not connect the side vent aperture to the lower vent aperture, whereby bees may not pass to the exterior of the multipurpose beehive access structure through the internal passageway of the vent block.

10. The multipurpose beehive access structure of claim 9 wherein the bottom plate structure comprises two bottom plates that are separated by the central aperture.

11. The multipurpose beehive access structure of claim 9 further comprising a queen cage aperture passing through the at least one cover plate of the cover assembly or through the bottom plate structure of the housing, the queen cage aperture for receiving a queen cage and providing a passageway between the queen cage and the interior space of a standard beehive box if the multipurpose beehive access structure is removably placed on top of the standard beehive box.

12. The multipurpose beehive access structure of claim 11 further comprising a removable aperture cover that is configured to cover the queen cage aperture.

13. The multipurpose beehive access structure of claim 11 further comprising a removable spacer enclosure that surrounds the queen cage aperture and surrounds a space above the queen cage aperture.

14. The multipurpose beehive access structure of claim 13 further comprising a removable aperture cover that covers the removable spacer enclosure and encloses the space therein.

15. The multipurpose beehive access structure of claim 9 wherein the cover assembly further comprises a plate vent aperture passing through the cover plate, the plate vent aperture providing a ventilation passageway into the interior space of the housing.

16. The multipurpose beehive access structure of claim 9 further comprising a vent screen disposed between the side vent aperture and the first opening or between the lower vent aperture and the second opening when the vent block is in the first position, the vent screen providing air ventilation while blocking the passage of bees.

17. The multipurpose beehive access structure of claim 9 wherein the cover assembly includes a handle for use in removing and replacing the cover assembly with respect to the housing.

\* \* \* \* \*